United States Patent [19]

Stenzenberger

[11] Patent Number: 4,806,419
[45] Date of Patent: Feb. 21, 1989

[54] BISIMIDE/POLYHYDANTOIN CURABLE RESINS

[75] Inventor: Horst Stenzenberger, Schriesheim, Fed. Rep. of Germany

[73] Assignee: The Boots Company plc, England

[21] Appl. No.: 23,656

[22] Filed: Mar. 6, 1987

Related U.S. Application Data

[63] Continuation of Ser. No. 856,689, Apr. 25, 1986, abandoned, which is a continuation of Ser. No. 600,058, Oct. 12, 1984, abandoned.

[30] Foreign Application Priority Data

Nov. 4, 1983 [GB] United Kingdom ............... 8329530

[51] Int. Cl.⁴ .................... B32B 27/34; C08F 283/00
[52] U.S. Cl. .................................. 428/287; 524/104;
524/106; 524/113; 524/211; 524/233; 524/315;
524/317; 524/356; 524/360; 524/378; 524/386;
524/607; 525/417; 525/420; 525/422; 428/284;
428/285; 428/290; 428/296; 428/423.3;
428/473.5
[58] Field of Search ............... 525/422, 540, 907, 908,
525/929, 417, 420, 432; 524/233, 315, 317, 356,
360, 378, 386, 607

[56] References Cited

U.S. PATENT DOCUMENTS

| | | | |
|---|---|---|---|
| 3,397,253 | 8/1968 | Merten et al. | 525/423 X |
| 3,972,960 | 8/1976 | Bargain | 525/929 X |
| 4,303,779 | 12/1981 | Stenzenberger | 525/422 X |
| 4,499,245 | 2/1985 | Ikeguchi et al. | 525/417 |

FOREIGN PATENT DOCUMENTS

| | | |
|---|---|---|
| 0032644 | 7/1981 | European Pat. Off. |
| 1443067 | 7/1976 | United Kingdom . |
| 2060490 | 5/1981 | United Kingdom . |
| 2125806 | 3/1984 | United Kingdom . |

OTHER PUBLICATIONS

Fukami et al, Chem. Abst., vol. 88, 122804c (1978).

Primary Examiner—Theodore E. Pertilla
Attorney, Agent, or Firm—Jacobs & Jacobs

[57] ABSTRACT (1) Curable bisimide resins comprise a mixture of
(a) 5 to 95% of at least one bisimide of the general formula I

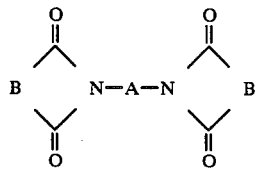

in which B represents a divalent radical containing a carbon-carbon double bond and A is a divalent radical containing at least two carbon atoms and
(b) 95 to 5% of a polyhydantoin polymer of formula II

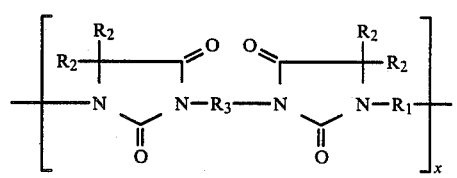

wherein $R_1$ represents an aromatic hydrocarbon radical, $R_2$ represents hydrogen or an alkyl group having 1 to 6 carbon atoms, $R_3$ represents an aromatic hydrocarbon radical, an alkyl radical having 4 to 10 carbon atoms optionally interrupted by one or more oxygen or sulphur atoms, and X is an integer of from 20 to 5000.

30 Claims, No Drawings

BISIMIDE/POLYHYDANTOIN CURABLE RESINS

CROSS REFERENCE

This is a continuation of Ser. No. 856,689 filed Apr. 25, 1986, now abandoned, which is a continuation of Ser. No. 600,058 filed Oct. 12, 1984, now abandoned.

Ths present invention relates to curable resins having good thermal stability, high impact stability and advantageous processing properties.

According to a first aspect the present invention curable resins comprise a mixture of at least one N,N'-bisimide resin of an unsaturated dicarboxylic acid of formula I

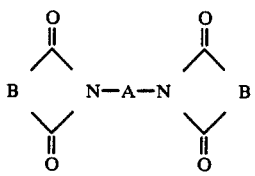

in which B represents a divalent radical containing a carbon-carbonb double bond and A is a divalent radical containing at least two carbon atoms with a polyhydantoin of formula II

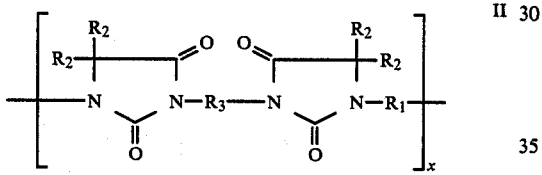

wherein $R_1$ represents an aromatic hydrocarbon radical, $R_2$ represents hydrogen or an alkyl group having 1 to 6 carbon atoms, $R_3$ represents an aromatic hydrocarbon radical or an alkyl radical having 4 to 10 carbon atoms optionally interrupted by one or more oxygen or sulphur and x is an interger from 20 to 5000 said mixture being characteristic in that the ratio of bisimide (I) and polyhydantoin (II) is between 95:5 and 5:95.

The radical designated A in general formula I may be (a) an alkylene group with up to 12 carbon atoms (b) a cycloalkylene group with 5 to 6 carbon atoms, (c) a heterocyclic group with 4 to 5 carbon atoms and at least one nitrogen, oxygen or sulphur atom in the ring, (d) a mono or dicarbocyclic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, or a group of formula IIIa to IIIj —N=N—  IIIa

  IIIb

—NR$_4$—  IIIc
—P(O)R$_5$—  IIId

  IIIe

—SO$_2$—  IIIf

  IIIg

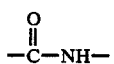  IIIh

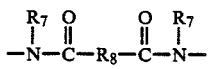  IIIi

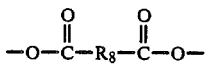  IIIj the radicals $R_4$, $R_5$, $R_6$, $R_7$, being alkyl groups with one to five carbonb atoms, $R_8$ being an alkylene gropu or an arylene group.

The radical B in the general formula I represents a divalent organic radical containing a carbon-carbon double bond. The radical B may have a structure as shown in formula IV, V, VI or VII

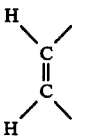  IV

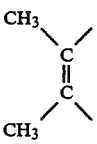  V

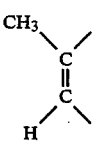  VI

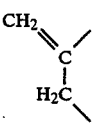  VII

Bismaleimides of formula I in which the radical B is of formula IV may be used for producing the new curable resins of the present invention. Examples of suitable bismaleimides are 1,2-bismaleimidoethane, 1,6-bismaleimidohexane, 1,12-bismaleimidododecane, 1,6-bismaleimido-(2,2,4-trimethyl)hexane, 1,3-bismaleimidobenzene, 1,4-bismaleimidobenzene, 4,4'-bismaleimidodiphenylmethane, 4,4'-bismaleimidodiphenylether, 4,4'-bidmaleimidodiphenylsulphide, 3,3'-bismaleimidodiphenylsulphone, 4,4'-bismaleimidodipheynlsulphone, 4,4'-bismaleimidodicyclohexylmethane, 2,4-bismaleimidotoluene, 2,6-bismaleimidotoluene,, 2,4-bismaleimidoanisole, N,N'-m-xylylenebismaleimide, N,N'p-xylylenebismaleimide. Examples of other suitable bisimides are N,N'-m-phenylene-biscitraconomide and N,N'-4,4'-diphenylmethane-citraconimide, in which the radical B is of formula VI and N,N'-4,4'-diphenylmethane-bis-itaconomide in which the radical B is of formula VII. Mixtures of bisimides may be used. Preferred mixtures of bismaleimides are those which form low melting eutectic mixtures for examples (i) eutectic mixtures containing 4,4'-bismaleimidodiphenylmethane and 2,4-bismaleimidotoluene, (ii) eutectic mixtures containing 4,4'-bismaleimidodiphenylmethane, 2,4-bismaleimidotoluene and 1,6-bismaleimido(2,2,4-trimethyl)hexane and (iii) eutectic mixtures of 4,4'-bismaleimidodiphenylmethane and 2,4-bismaleimidoanisole.

The bisimides of formula I may be modified with polyamines, polyhydrazides, amino acid hydrazides, azomethines or mixtures thereof. These modified bisimides are used in a similar manner to that described herein for bisimides of formula I to prepare curable resins of the present invention.

The radical designated $R_1$ in formula II may be an aromatic radical derived from benzene, azobenzene naphthalene, anthracene, diphenylmethane, triphenylmethane, a diphenylalkane, a diphenylalkene, diphenylether, diphenylthioether and a polyphenylether. Preferably the radical $R_1$ is a radical derived from a benzene, naphthalene, diphenylmethane or diphenylether radical optionally substituted by one or more methyl or chloro groups. The radical $R_3$ may have the meaning given above in respect of $R_1$ or may be an alkyl radical having 4 to 10 carbon atoms optionally interrupted by one or more oxygen or sulphur atoms. Particularly preferred polyhydantoins of formula II and those in which $R_1$ and $R_3$ are 4,4'-diphenylmethane radicals and $R_2$ is H or a methyl group. Suitable polyhydantoin polymers are described in U.S. Pat. No. 3,397,253.

The preparation of the new curable resins may be carried out in an inert organic solvent or diluent, for example, in dimethyl formamide, dimethylacetamide, N-methyl pyrrolidone and tetramethyl urea, or ketone type solvents such as acetone, methyl-ethyl ketone, methyl isobutyl ketone and cyclohexanone or chlorinated solvents such as methylene chloride, ethyl chloride, 1,2-dichloroethane and ether-type solvents such as dioxane, tetrahydrofuran ethyl glycol and ester type solvents such as ethyl acetate or mixed glycol etheresters such as ethyl glycol acetate methyl glycol acetate, diethylene glycol diethyl ether, diethylene glycol monoethyl ether acetate etc. in such a manner that prepolymer solutions are obtained. The prepolymer can be isolated by stripping off the solvent either in vacuum or by heat or both, thus providing a solventless resin that can either be process from the melt or as a powder.

The preparation of the new curable resins may be performed by using conventional techniques for mixing and grinding of powders or powders and liquids to intimately blend the bismaleimides with the polyhydantoin. Prepolymers are obtained by heating the homogeneous mixture at a temperature between 80° and 200° C., for sufficient time to produce a still formable and soluble product.

The production of the new curable resins according to this invention can also be carried out in inert diluents in which either only one of the starting materials is completely soluble or all the starting components are completely soluble. The latter procedure is preferred when the application of the resin requires a solution as is the case for the production of prepregs.

For man industrial applications of the new curable resins of the present invention, it is advantageous to accelerate the curing process by adding catalysts. Effective curing catalysts are organic peroxides such as ditertiary butyl peroxide, diamyl peroxide, t-butyl perbenzoate in the concentration of 0.05 to 1.5% in relation to the total weight of the curable bisimide resin. Other catalysts that may be used are tertiary amines like N,N'-dimethylaniline, N,N'-dimethyl-benzylamine, N-methylmorpholine, tri-n-butylamine, tri-methylamine and azabicyclooctane and others.

The catalysts can be admixed with the components of the curable resins or they may be added during the production of the prepolymers either by a powder blending process or by the solvent blending process described above.

In many cases the new curable resins of the present invention may be processed from the melt. To reduce the melt viscosity and to improve the pot life the resins can be blended with so-called reactive diluents, preferably those that are liquid at room temperature. The reactive diluents that may be employed carry one or more polymerizable double bonds of the general formula VIII

$$CH_2SO\ C< \qquad\qquad VIII$$

and may be of the vinyl-, allyl- or acryl-type. These reactive diluents can be of the ether, ester, hydrocarbon or heterocyclic type. Typical ethers that may be employed are vinylallylether, diallylether, methallylether and vinylphenylether. Typical esters are vinyl-, allyl, emthylallyl, 1-chloroallyl-, crotyl-, isopropenyl esters derived from saturated or unsaturated aliphatic or aromatic mono- or polycarboxylic acids such as formic, acetic, propionic, butyric, oxalic, malonic, adipic, sebacic, acrylic, methacrylic, phenylacrylic, crotonic, maleic, fumaric, itaconic, citraconic, tetrahyrophthalic, benzoic, phenylacetic, o-phthalic, isophthalic or terephthalic acid and naphthalic-dicarboxylic acid or mixtures thereof. The most important hydrocarbon type reactive diluents to be used are styrene, methylstyrene, vinylhexane, vinylcyclohexane, divinylbenzene, divinyl cyclohexane, diallybenzene, vinyltoluene and 1-vinyl-4-ethyl-benzene or mixtures thereof. Examples of heterocyclic type reactive diluents are vinylpyridine and vinylpyrrolidine.

In those cases where reactive diluents are used it is possible to first blend the bisimide components with the reactive diluent and then the polyhydantoin component is added. The quantity of reactive diluent that may be employed can be up to 80% by weight of the total final resin mixture.

Very advantageous reactive diluents are styrene and divinylbenzene which are used in quantitites up to 30% of the total resin mixture. Care has to be taken with these diluents because they crosslink at very low temperatures, at around 100°–110° C., therefore mixtures containing these diluents have to be prepared at temperatures well below 100° C.

The new curable resins of the present invention can be further modified with unsaturated polyester resins. Useful unsaturated polyesters are well known products which are prepared by polycondensation of polycarboxylic acid derivatives such as esters with polyglycols as described in detail in Kunststoffhandbuch, Band VII, p. 247–282, Carl Hanser Verlag, Munchen 1973.

Solutions of these polyesters in the reactive diluents described above can be used instead of the reactive diluent alone to modify the new resins.

The new curable resins of the present invention either modified or not or prepolymers prepared therefrom can be thermally converted to crosslinked polymers by heating them to temperatures of between 80° and 400° C., for a time sufficient to complete cure.

The new curable resins are advantageously used to produce laminated materials. In such a case the prepolymers produced from the curable resins are dissolved in suitable solvents to provide a 25-65% by weight solution, which is used to impregnate glass fibres in the form of fabrics or rovings or carbon fibres or boron fibres or organic synthetic fibres in the form of fabrics, filaments or rovings. The material impregnated with this solution is then stripped of the solvent by drying after which they are moulded into laminate form by the application of pressure and temperature, the crosslinked polymer being the binder.

The curable resins according to the invention can also be processed by the known methods of the powder moulding industry in relation to curable compositions, to produce mouldings, curing out taking place with simultaneous shaping under pressure. For these applications it is possible to admix with the curable resins additives such as fillers, colourants, softeners and flameproofing agents. Ideal fillers are for example glass fibres, carbon fibres, organic high modulus fibres such as aramides, quartz flour, kaolin, silica and metals in the form of fine powders.

One of the preferred uses of the new resin composition is as binders for fibre composites. For this application fibres such as glass, graphite or aramides in the form of rovings, fabrics or short fibremats, or felts are impregnated with the composition, employing resin solution as mentioned above to impregnate said reinforcements. After stripping off or drying off the solvent employed a prepreg is left, which in the second phase may be cured at a temperature between 180° and 350° C., optionally under pressure. The resin composition, which may be employed in the processes described can widely vary in composition. Techniques such as autoclave moulding, so called low pressure moulding processes, require resin formulations which show advantageous flow properties such as are provided by resins, consisting of an excess of bisimide and a lower proportion of polyhydantoin. Other applications require high pressure moulding conditions and if this is the case, resin compositions that contain an excess of polyhydantion are employed.

In another preferred use of the resin compositions of the present invention the resin is cast into film and sheets of film are stacked alternately with layers of reinforcing material for example glass fibre. The resulting stack is subjected to heat and pressure to form a laminated structure.

The invention will be illustrated by the following Examples.

EXAMPLE 1

A polyhydantion was prepared according to U.S. Pat. No. 3,397,253 example 1 in m-cresol solution. The prepolymer was isolated by adding the cresol solution of the polyhydantion to methanol with stirring to precipitate the polyhydantoin. The polymer was isolated by filtration, washed several times with methanol and dried. The inherent viscosity of the polyhydantoin was 0.58 dl/g (e=0.5 g/dl solvent dimethylacetamide).

A solution of the curable resin was prepared by dissolving the polyhydantoin (50 g) and a eutectic bismaleimide mixture (50 g) containing 4,4-bismaleimidodiphenylmethane (35 g) and 2,4-bismaleimidotoluene (15 g) in methylene chloride (900 g). The solution was used to impregnate a glass fabric (Type GP2111/A1100 sold by Interglas, Ulm, West Germany) to form a prepreg containing 40% by weight of curable resin after drying off the solvent. 10 prepreg layers of the size 150×150 mm were stacked between aluminium foil and placed in a heated platen press, which was preheated to 170° C. The stacked prepregs were pressed for one hour at 170° C. and two hours at 210° C., at a pressure of 500 N/cm$^2$. The laminate thus obtained was postcured at 250° C. for 15 hours in a circulating air oven to fully cure the resin.

The laminate showed the following properties:

| | |
|---|---|
| Thickness | 1.92 mm |
| Flexural strength at 25° C. | 685 N/mm$^2$ |
| Flexural strength at 250° C. | 430 N/mm$^2$ |
| Flexural modulus at 25° C. | 22.7 KN/mm$^2$ |
| Flexural modulus at 250° C. | 20.56 KN/mm$^2$ |
| Interlaminar shear strength at 25° C. | 66.45 N/mm$^2$ |
| Interlaminar shear strength at 250° C. | 36.59 N/mm$^2$ |

EXAMPLE 2

A curable resin composition consisting of 70% by weight of the eutectic bismaleimide and 30% of polyhydantoin, as described in example 1, was prepared by dissolving the constituents in methylene chloride as a solvent. This solution is used to impregnate a 300 g 4H satin weave graphite fibre fabric to form a prepreg containing 40% by weight of the curable resin composition.

Eight layers of prepreg are stacked and moulded employing the low pressure autoclave moulding techniques. The pressure used was 100 N/cm$^2$, which was applied at the beginning of the cure cycle. The temperature was raised to 170° C. and held for 15 minutes, then the temperature was raised to 210° C. and the laminate cured for 2 hours. Vacuum was pulled throughout the whole cure cycle.

The laminate obtained was postcured for 15 hours at 250° C. and then showed the following properties:

| | |
|---|---|
| Fibre content | 56.26% by volume |
| Density | 1.54 g/ml |
| Flexural strength at 25° C. | 766 N/mm$^2$ |
| Flexural strength at 250° C. | 787 N/mm$^2$ |
| Flexural modulus at 25° C. | 58.69 KN/mm$^2$ |
| Flexural modulus at 250° C. | 66.97 KN/mm$^2$ |
| Shear strength at 25° C. | 32 N/mm$^2$ |
| Shear strength at 250° C. | 39 N/mm$^2$ |

EXAMPLE 3

The solution containing the curable resin as prepared in example 1 was used to impregnate a 300 g 4H satin weave graphite fabric to provide a prepreg containing 37.46% by weight of resin after having dried off the methylene chloride solvent. A stack of 8 layers of prepreg was cured in a heated platen press between the preheated platens of the press (170° C.). The cure time was 15 minutes at 170° C., followed by 2 hours at 210° C. After a 15 hours postcure the laminate showed the following properties:

| | |
|---|---|
| Density | 1.54 g/ml |
| Flexural strength at 25° C. | 674 N/mm$^2$ |

-continued

| Flexural strength at 250° C. | 694 N/mm² |
|---|---|
| Flexural modulus at 25° C. | 47.7 KN/mm² |
| Flexural modulus at 250° C. | 48.4 KN/mm² |
| Shear strength at 25° C. | 44 N/mm² |
| Shear strength at 250° C. | 42 N/mm² |

EXAMPLE 4

A curable resin composition of 60% by weight of the polyhydantoin described in Example 1 and 40% by weight of the eutectic bismaleimide mixture described in Example 1, was prepared by dissolving the constituents in methylene chloride to provide a solution containing 10% by weight of curable resin. The solution is used to cast a film on a glass plate with dimensions of 500×500 mm which was dammed with glass trips, by pouring said solution of curable resin onto the glass plate. The solvent was stripped off by drying at 60° C. for 3 hours. The film of curable resin was pulled off the glass plate and dired in a circulating air oven at 70° C. for 15 hours.

The film of curable resin was cut into 9 pieces, each 150×150 mm. The pieces were stacked alternatively with glass fabric (style 92111, Interglas ULM), 8 pieces 150×150 mm and the stack was sandwiched between aluminium foils and inserted into a heated platen press. The platens of the press were preheated to 170° C. The curing of the laminate was performed at a pressure of 500 N.cm$^{-2}$ for 1 hour at 170° C. followed by 2 hours at 230° C. The laminate was postcured for 15 hours at 250° C. without pressure providing the following properties:

| Fibre content | 49.6% by volume |
|---|---|
| Density | 1.85 g/ml |
| Flexural strength at 20° C. | 650 N/mm² |
| Flexural strength at 250° C. | 430 N/mm² |
| Flexural modulus at 20° C. | 22.7 KN/mm² |
| Flexural modulus at 250° C. | 20.6 KN/mm² |
| Interlaminar Shear strength at 20° C. | 65 N/mm² |
| Interlaminar Shear strength at 250° C. | 36 N/mm² |

EXAMPLE 5

A curable resin composition of 80% by weight of the polyhydantoin composition described in Example 1 and 20% by weight of the eutectic bismaleimide mixture described in Example 1 was prepared by dissolving the constituents in methylene chloride as a solvent to provide an 8% by weight solution of the curable resin. The solution was used to impregnate a graphite fibre (300 g 4H satin weave) to form a prepreg containing 60% by weight of fibre, 36.35% by weight of curable resin and 3.25% of volatiles.

Eight layers of prepreg were stacked in a heated platen press between aluminium foil and cured under a pressure of 500 N/cm² for 15 minutes at 170° C. and 2 hours at 210° C. After demoulding, the laminate was postcured for 15 hours at 250° C., showing the following mechanical properties:

| Fibre content | 52.3% by weight |
|---|---|
| Flexural strength at 25° C. | 491 N/mm² |
| Flexural strength at 250° C. | 420 N/mm² |
| Flexural modulus at 25° C. | 41.4 KN/mm² |
| Flexural modulus at 250° C. | 41.6 KN/mm² |

EXAMPLE 6

A curable resin composition of 95% by weight of the eutectic bismaleimide mixture described in Example 1 and 5% by weight of the polyhydantoin described in Example 1 was prepared by dissolving the constituents in methylene chloride to provide a 40% by weight solution, to which 0.25% by weight of diazabicyclooctane was added. The resulting solution was used to fabricate a unidirectional carbon fibre prepreg, employing a filament winding operation (drum filament winding). The carbon fibres used were Celion 600 from the Celanese Corporation. The prepreg was dried while still on the mandrel, and the solvent content adjusted to 2.5%. The prepreg was moulded into a unidirectional laminate by using standard low pressure autoclave technique. The cure pressure employed was 5 bars and the cure temperature was 190° C. for 3 hours. After demoulding and postcure, the laminate showed the following properties:

| Fibre content | 62% by volume |
|---|---|
| Flexural strength at 25° C. | 1885 N/mm² |
| Flexural strength at 250° C. | 1420 N/mm² |
| Flexural modulus at 25° C. | 124 KN/mm² |
| Flexural modulus at 250° C. | 124 KN/mm² |
| Short Beam Shear strength at 25° C. | 95 N/mm² |
| Short Beam Shear strength at 250° C. | 62 N/mm² |

EXAMPLE 7

A curable resin composition consisting of 95% of a bismaleimide resin and 5% of the polyhydantoin described in Example 1, in which the bismaleimide mixture was an eutectic mixture of 65% 4,4'bismaleimidodiphenylmethane and 35% 2,4'bismaleimidoanisole, was prepared as described in Example 6. The composition can be processed in the same manner as the resin in Example 6, providing almost identical laminate properties.

The following bismaleimides or bismaleimide mixtures may be used to replace the eutectic mixture used above: 4,4'-bismaleimidodiphenylether, 2,6-bismaleimidotoluene, 2,4-bismaleimidoanisole, 4,4'-bismaleimidodiphenylsulphone, 3,3'-bismaleimidodiphenylsulphone, 2,3-bismaleimidobenzene, 1,4-bismaleimidobenzene, 1,2-bismaleimidoethane, 1,6-bismaleimidohexane and 1,6-bismaleimido(2,2,4-trimethyl)hexane.

Preferred are those mixtures of bismaleimides which form low melting eutectic mixtures. One of the preferred, bismaleimide mixtures comprises 4,4'-bismaleimidodiphenylmethane, 2,4-bismaleimidotoluene and 1,6-bismaleimido(2,2,4-trimethyl)hexane.

EXAMPLE 8

A curable resin composition consisting of 56 g 4,4'-bismaleimidodiphenylmethane, 24 g 2,4-bismaleimidotoluene and 30 g of the unsaturated polyester imide Dobekan FT 3018 from Messrs. Beck, Hamburg, and 80 g of the polyhydantoin described in Example 1 is prepared by blending the said constituents in methylene chloride as a solvent to form a 15% by weight solution.1 This solution is employed to impregnate glass fabric of the type G92111/A1100 of Interglass, Ulm, West Germany, to provide, after drying in circulating air at 70° C. for 15 hours, a prepreg containing 32% by weight of resin.

Prepregs are stacked in a heated platen press and moulded between aluminium foil at a pressure of 500 N/cm² for 15 minutes at 170° C. followed by 3 hours at 210° C. After demoulding, the laminate is postcured for 15 hours at 250° C. The flexural strength retention of the laminate was 75% when measured at 250° C., as compared with the room temperature value.

EXAMPLE 9

85 g of 4,4-bismaleimidodiphenylmethane, 7 g of m-amino-benzoic acid hydrazide are intimately mixed in a ball mill to yield a homogeneous powder which is heated in a circulating air oven to a temperature of 155° C. and held for 10 minutes. After cooling, the resolidifed molten mass is ground to yield a modified bismaleimide resin as a fine yellow powder. Such modified bismaleimide resins are described in U.S. Pat. No. 4,211,861.

A curable resin composition consisting of 60 parts of the modified bismaleimide resin prepared as described above, 40 parts of polyhydantoin as described in Example 1 and 5 parts of o-diallyphthalate are dissolvedn in N-methylpyrrolidone as a solvent to form a varnish, to which 0.6% of diazabicyclooctane based on bismaleimide resin is added, and which is then used to impregnate a light glass fabric [style Interglass Ulm 01837 (45 g/m²)] to provide, after drying at 120° C. for 15 minutes, a prepreg which contains 70% by weight of the curable resin composition and 8% of residual solvent.

The prepreg is used to adhesively bond aluminium against aluminium and the lap shear specimens are tested against DIN 53283, providing a lap shear strength of 21 N/m². The lap shear specimens were bonded at 210° C. for 2 hours and at a presence of 100 N/cm², and postcured at 240° C. for 10 hours.

I claim:
1. Curable bisimide resins comprising a mixture of
(a) a mixture of at least two bisimides of the general formula I

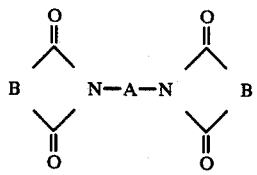

in which B reporesents a divalent radical containing a carbon-carbon double bond and A is a divalent radical containing at least two carbon atoms; and
(b) a polyhydantoin polymer of formula II

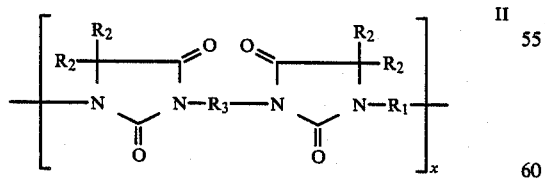

wherein $R_1$ represents an aromatic hydrocarbon radical, $R_2$ represents hydrogen or an alkyl group having 1 to 6 carbon atoms, $R_3$ represents an aromatic hydrocarbon, an alkyl radical having 4 to 10 carbon atoms or an alkyl radical having 4 to 10 carbon atoms interrupted by one or more oxygen or sulphur atoms, and x is an integer from 20 to 5000; and wherein the ratio of bisimide (I) and polyhydantoin (II) is between 95:5 and 40:60.

2. Curable bisimide resins according to claim 1, wherein

A is selected from the group consisting of (a) an alkylene gropu with up to 12 carbon atoms, (b) a cycloalkylene gropu with 5 or 6 carbon atoms, (c) a heterocyclic group with 4 or 5 carbon atoms and at least one nitrogen, oxygen or sulphur atom in the ring, (d) a mono or dicarbocyclic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, and a group of formulae IIIa to IIIj

   IIIa

   IIIb

   IIIc
                       IIId

   IIIe

   IIIf

   IIIg

   IIIh

  IIIi

  IIIj the radicals $R_4$, $R_5$, $R_6$, $R_7$, being alkyl groups with one to five carbon atoms, $R_8$ being an alkylene group or an arylene group and B is a group which is capable of addition polymerization selected from a group of formula IV, V, VI and VII

   IV

   V

-continued

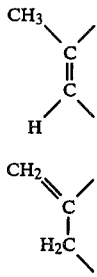

3. Curable bisimide resins as claimed in claim 2 in which the bisimide of formula I is selected from the group consisting of mixtures containing 1,2-bismaleimidoethane, 1,6-bismaleimidohexane, 1,12-bismaleimidododecane, 1,6-bismaleimido-(2,2,4-trimethyl)hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulphide, 3,3'-bismaleimidodiphenylsulphone, 4,4'-bismaleimidodiphenylsulphone, 4,4'-bismaleimidodicyclohexylmethane, 2,4-bismaleimidotoluene, 2,6-bismaleimidotoluene, 2,4-bismaleimidoanisole, N,N'-m-xylylenebismaleimide and N,N'-p-xylylenebismaleimide.

4. Curable bisimide resins as claims in claim 3, in which the bisimide of formula I is selected from the group consisting of (i) eutectic mixtures containing 4,4'-bismaleimidodiphenylmethane and 2,4-bismaleimidotoluene, (ii) eutectic mixtures containing 4,4'-bismaleimidodiphenylmethane, 2,4,-bismaleimidotoluene and 1,6-bismaleimido(2,2,4-trimethyl)hexane and (iii) eutectic mixtures of 4,4'-bismaleimidodiphenylmethane and 2,4-bismaleimidoanisole.

5. Curable bisimide resins according to claim 1, in which $R_1$ is a radical derived from benezene, azobenzene, napthtalene, anthracene, diphenylmethane, triphenylmethane, a diphenylalkane, a diphenylalkene, diphenylether, diphenylthioether or polyphenylether, $R_2$ is hydrogen or an alkyl group having 1 to 6 carbon atoms, $R_3$ is a radical defined as above in respect of $R_1$ or an alkyl radical having 4 to 10 carbon atoms or an alkyl radical having 4 to 10 carbon atoms interrupted by one or more oxygen or sulphur atoms, and x is a number between 20 and 5000.

6. Curable resins according to claim 1, in which $R_1$ is a radical derived from benzene, naphthalene, diphenylmethane or diphenylether, unsubstituted or substituted by one or more methyl groups or chlorine atoms, $R_2$ is hydrogen or an alkyl radical having 1 to 6 carbon atoms, $R_3$ is a radical as above in respect of $R_1$ or an alkyl radical having 4 to 10 carbon atoms, and x is a number between 20 and 5000.

7. Curable bisimide resins according to claim 1, wherein $R_1$ and $R_3$ are 4,4-diphenylmethane radicals adn $R_2$ is H or methyl.

8. Curable bisimide resins as claimed in claim 1 containing a reactive diluent which carries at least one polymerizable double bond of the general formula VIII

(VIII)

said double bond being selected from the group consisting of vinyl-, allyl and acryl.

9. Curable bisimide resins as claimed in claim 8 in which the reactive diluent is selected from the group consisting of styrene, methylstyrene, vinyltoluene, divinylbenzene, vinylcyclohexane, divinylcyclohexane, vinylpyridine and vinylpyrrolidone.

10. Curable resins as claimed in claim 9 wherein the reactive diluent is present in quantities up to 80% of the total final resin mixture by weight.

11. Curable resins as claimed in claim 10 wherein the reactive diluent is styrene or divinylbenzene, the reactive diluent being present in quantities up to 305 of the total final resin mixture by weight.

12. Curable resins as claimed in claim 1, said resins containing an unsaturated polyester, the said unsaturated polyester being obtained by the polycondensation of polycarboxylic acids with polyglycols.

13. Curable resins as claimed in claim 1, wherein the bisimide of the general formula (I) is modified with compounds selected from one of the following groups: polyamines, polyhydrazides, amino acid hydrazides, azomethines, and mixtures thereof.

14. Curable resins as claimed in claim 1, including a curing catalyst selected from one of the following compounds:
ditertiary butyl peroxide,
diamyl peroxide,
t-butyl perbenzoate,
N,N' dimethylbenzylamine,
N,N' dimethyl aniline,
N-methylmorpholine,
tri-n-butylamine,
tri-methylamine and
azabicyclooctane.

15. Curable resins as claimed in claim 14 wherein a peroxide catalyst is present in a concentration of 0.05 to 1.5% of the total final resin mixture by weight.

16. Prepolymers obtained by heating the curable resins as claimed in claim 1 to temperatures of between 80° and 200° C. for a time sufficient to obtain a still formable product.

17. Prepolymers as claimed in claim 16 wherein a catalyst is used and the resin mixture is in the melt form or in solution.

18. Solutions of curable resins as claimed in claim 1 to an inert organic solvent selected from dimethylformamide, dimethylacetamide, N-methyl pyrrolidone, tetramethyl urea, acetone, methyl-ethyl ketone, methylisobutyl ketone, cyclohexanone, methylene chlroide, ethyl chloride, 1,2-dichloroethane, dixoane, tetrahydrofuran, ethyl glycol, ethyl acetate, ethyl glycol acetate, methyl glycol acetate, diethyleneglycol diethyl ether, diethyleneglycol monoethyl ether acetate and mixtures thereof.

19. Solutions according to claim 18, wherein the solution is suitable for producing laminates in which the resin is present in a concentration of 25 to 65% of the solution by weight.

20. Crosslinked polymers derived by heating the curable resin mixtures of claim 1 to temperatures of between 80° and 400° C. for a time sufficient to complete cure.

21. Crosslinked polymers derived by heating the prepolymers of claims 16 or 17 to temperatures of between 80° and 400° C. for a time sufficient to complete cure.

22. Fibrous materials impregnated with curable resins, prepolymers, or solutions comprising the curable bisimide resins of claim 1.

23. Impregnated materials as claimed in claim 22 in which the fibrous materials are selected from the group consisting of rovings, fabrics, mats and felts.

24. Films cast from solutions of curable resins as claimed in claim 10.

25. Laminated articles formed under heat and pressure from an alternating stack of films as claimed in claim 24 and layers of reinforcing material.

26. Articles formed under heat and pressure from the curable resins claimed in claim 1.

27. Articles formed under heat and pressure from the prepolymers clamed in claim 16.

28. Articles formed under heat and pressure from the impregnated fibrous materials as claimed in claim 22.

29. Articles formed under heat and pressure from the impregnated fibrous materials as claimed in claim 23.

30. Articles formed under heat and pressure from the prepolymers as claimed in claim 17.

* * * * *